US007664860B2

(12) United States Patent
Beck et al.

(10) Patent No.: US 7,664,860 B2
(45) Date of Patent: Feb. 16, 2010

(54) SESSION HANDLING

(75) Inventors: Stefan Beck, Leimen (DE); Markus Cherdron, Muehlhausen (DE); Joerg Singler, Messkirch (DE)

(73) Assignee: SAP AG, Walldorf (DE)

( * ) Notice: Subject to any disclaimer, the term of this patent is extended or adjusted under 35 U.S.C. 154(b) by 829 days.

(21) Appl. No.: 10/653,407

(22) Filed: Sep. 2, 2003

(65) Prior Publication Data

US 2005/0050204 A1 Mar. 3, 2005

(51) Int. Cl.
*G06F 15/16* (2006.01)

(52) U.S. Cl. ...................................... 709/227; 718/107

(58) Field of Classification Search ................. 709/219, 709/227, 229
See application file for complete search history.

(56) References Cited

U.S. PATENT DOCUMENTS

| | | | | |
|---|---|---|---|---|
| 5,835,724 | A * | 11/1998 | Smith | 709/227 |
| 6,076,108 | A * | 6/2000 | Courts et al. | 709/227 |
| 6,085,247 | A * | 7/2000 | Parsons et al. | 709/227 |
| 6,195,676 | B1 * | 2/2001 | Spix et al. | 718/107 |
| 6,199,065 | B1 * | 3/2001 | Kenyon | 709/225 |
| 6,314,463 | B1 * | 11/2001 | Abbott et al. | 709/224 |
| 6,323,881 | B1 * | 11/2001 | Broulik et al. | 709/227 |
| 6,349,342 | B1 * | 2/2002 | Menges et al. | 719/316 |
| 6,363,421 | B2 * | 3/2002 | Barker et al. | 709/223 |
| 6,377,993 | B1 * | 4/2002 | Brandt et al. | 709/227 |
| 6,393,477 | B1 * | 5/2002 | Paxhia et al. | 709/223 |
| 6,931,530 | B2 * | 8/2005 | Pham et al. | 709/225 |

OTHER PUBLICATIONS

"Servlet Web Hosting". Vision Web Hosting. Dec. 26, 2005. <http://www.visionwebhosting.net/servlet-web-hosting/>.*

Comer, Douglas et al. Internetworking with TCP/IP vol. III: Client-Server Programming and Applications. Linux/POSIX Sockets Version. Prentice Hall. 2001. pp. 12, 40, Chapters 13, 15.*

* cited by examiner

*Primary Examiner*—Vivek Srivastava
*Assistant Examiner*—Jeffrey R Swearingen
(74) *Attorney, Agent, or Firm*—Finnegan, Henderson, Farabow, Garrett & Dunner, LLP

(57) ABSTRACT

A method includes, in a network, representing a first request from a first user as a first ClientUser, assigning the first ClientUser to a ServerSession, the ServerSession having one or more ClientSessions, each of the ClientSessions allowing a server to have a single session for all first user requests from the server. The method includes, in a client/server network, providing a session that can be common to all connections to a web server by a user.

34 Claims, 2 Drawing Sheets

SESSION HANDLING

FIELD OF THE INVENTION

The present invention relates to data processing by digital computer, and more particularly to session handling.

BACKGROUND

In a client/server network, session tracking keeps a server from having to ask whether a client (e.g., user) has connected before each time the server receives a request from the user. This is important in, for example, today's electronic commerce (e-commerce) Web applications.

There are generally two types of Internet communication protocols, i.e., statefull and stateless. A server associates a state with a connection. Statefull protocols, such as Telnet and file transfer protocol (FTP), can process multiple operations before closing a connection. The server generally knows that all requests come from a single user.

Stateless protocols, such as hypertext transfer protocol (HTTP), open separate connections to a server anytime a client requests a web page, and the server doesn't know a context or scope from one connection to the next connection. Each transaction is a single isolated transaction.

SUMMARY

The present invention provides methods and apparatus, including computer program products, for session handling.

In one aspect, the invention features a method including, in a network, representing a first request from a first user as a first ClientUser, assigning the first ClientUser to a ServerSession, the ServerSession having one or more ClientSessions, each of the ClientSessions allowing a server to have a single session for all first user requests from the server.

One or more of the following features can also be included. Each of the ClientSessions can represent an abstraction of an HTTP session unbound from hypertext transfer protocol (HTTP) peculiarities. The method can include receiving a second request from the first user as a second ClientUser, and assigning the second ClientUser to the ServerSession. The server can be a web server. The first ClientUser can be a client using a stateless protocol. The stateless protocol can be hypertext transfer protocol (HTTP). The method can include displaying a first application requested by the first user and associated with a first ClientApplication in a ClientWindow. The method can include displaying a second application requested by the first user and associated with a second ClientApplication in the ClientWindow. The method can include displaying a third application requested by the first user and associated with a third ClientApplication in the ClientWindow. The method can include alternately displaying ClientApplications in a single ClientWindow.

In another aspect, the invention features a method including, in a client server network, receiving a request for an application, obtaining a ClientSession, obtaining a ClientWindow, obtaining an ApplicationWindow, and executing the application in the application window of the ClientWindow.

One or more of the following features can also be included. The request can be a hypertext transfer protocol (HTTP) request. The ClientSession can be a hypertext transfer protocol (HTTP) session. The ClientWindow can represent a client session. The ApplicationWindow can be a client window.

In another aspect, the invention features a network including a browser client device, and a client manager residing in a server for receiving multiple hypertext transfer protocol (HTTP) requests from the browser client device and determining a single application window for execution of applications corresponding to the multiple HTTP requests.

One or more of the following features can also be included. The client manager can include a servlet. The client manager can establish a client session, a single server session, a client window and an application window in response to the multiple requests from the browser client device. The client session can be a hypertext transfer protocol (HTTP) session.

In another aspect, the invention features a method including, in a client/server network, providing a session that is common to all connections to a web server by a user.

One or more of the following features can also be included. The connections can be different browser processes. The connections can be different browsers. The connections can be different client devices. The user can be a client using a stateless protocol. The stateless protocol can be hypertext markup language (HTML) protocol.

The invention can be implemented to realize one or more of the following advantages.

With a ServerSession being common regardless of whether a HTTP session is common, a server can provide communication between two or more applications running in a single session. This is done independent of a client platform and even if applications are run from two different client platforms. One can have a ServerSession with one user using a personal computer (PC) platform and a personal data assistant (PDA) platform at the same time.

Having a common ServerSession means that a common scope is guaranteed to two applications running at the same time for the same user, regardless how or where from they were started.

The ServerSession can be used for stateless communication, so different applications can use one resource, e.g., personalization information.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
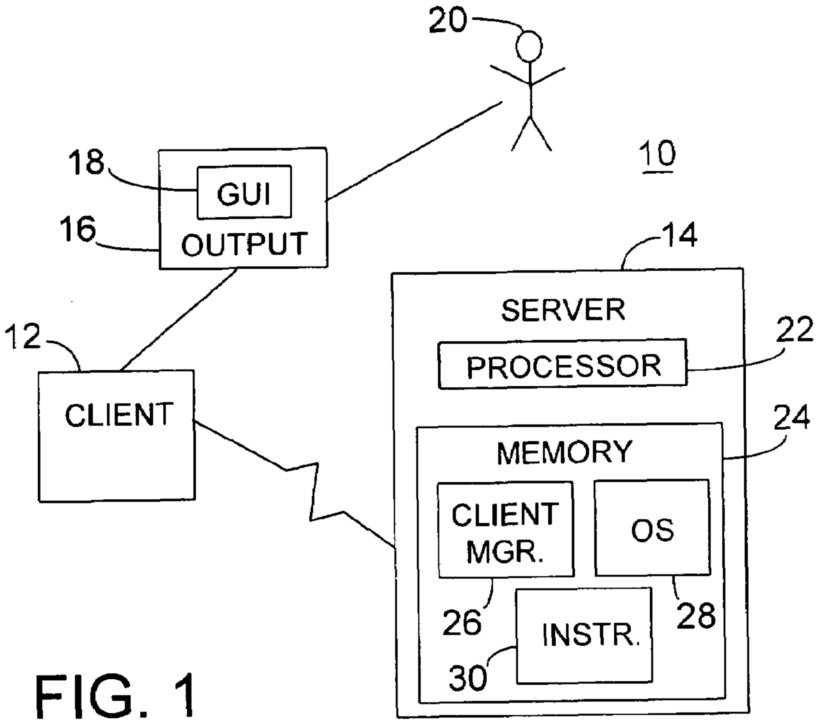
FIG. 1 is a block diagram of an exemplary client server network.

As shown in FIG. 1, an exemplary client/server network 10 includes a client 12 linked to a server 14. Client 12 includes an output device 16 for display of a graphical user interface (GUI) 18 to a user 20. In general, a client, such as client 12, is a requesting program or user 20 in a client/server relationship, such as in client/server network 10. For example, the user 20 of a Web browser (not shown), such as Netscape® Communicator or Microsoft® Internet Explorer, makes client requests for pages or execution of an application from servers, such as server 14. The Web browser itself is a client in its relationship with the server 14, which obtains and returns a requested hypertext markup language (HTML) file or executes an application. The computer handling the request and sending back the HTML file or executing the application is the server 14. Client 12 can be a Web client or a client using a "stateless" protocol such as hypertext transfer protocol (HTTP). HTTP is stateless because each time a client retrieves a Web page, for example, it opens a separate connection to a Web server such as server 14, and the Web server does not maintain contextual information or scope pertaining to the client.

In general, a server, such as the server 14, is a program that awaits and fulfills requests from client 12. Server 14 can include a processor 22 and a memory 24. Memory 24 can store an operating system ("OS") 28, a client manager 26 and machine-executable instructions 30 executed by processor 22 to perform a session handling process 100, described below.

Figure 2:
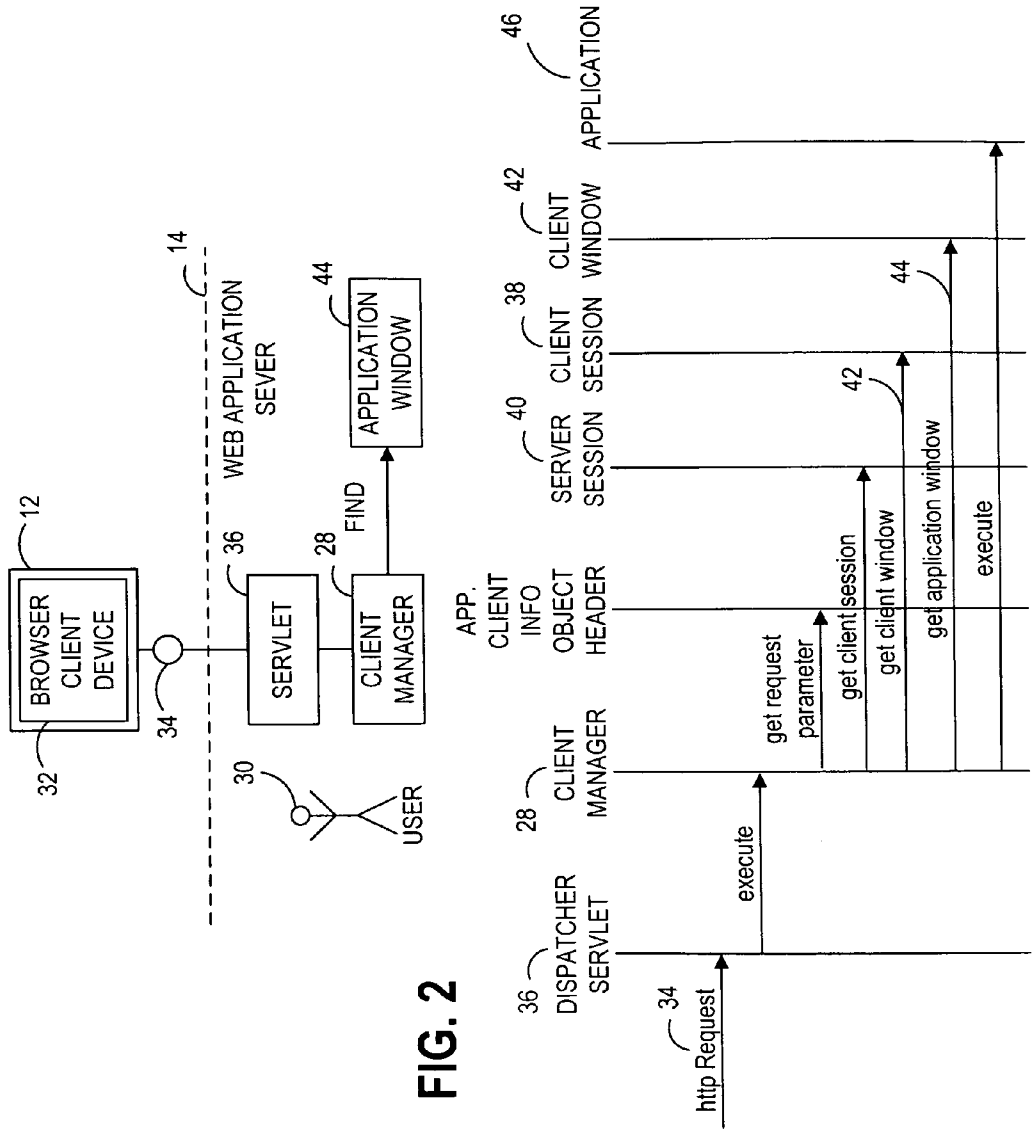
FIG. 2 is a sequence diagram.

As shown in FIG. 2, the client 12, user 30 (or more generally, a browser client device 32) sends a request, e.g., http request 34, to the server 14. The request 34 is often received by a dispatch servlet 36 and processed by the client manager 28. In general, a servlet is a small program that runs on a server. The servlet can be a Java servlet. Using a Java servlet, rather than causing a separate program process to be generated, each user request is invoked as a thread in a single daemon process, resulting in low system overhead to process the request.

The client 12 connects to the server 14 and is represented as a ClientUser that is assigned to a ServerSession. A ServerSession, for which the client 12 has exactly one, can have one or more ClientSessions. A ClientSession 38 can represent a hypertext transfer protocol (HTTP) session. The ClientSession 38 is an abstraction of an HTTP session and is generated so that the architecture shown in FIG. 2 is not bound by the format of any version of the HTTP protocol.

The ClientSession 38 allows the server 14 to have one session, i.e., the ServerSession 40, for everything the client 12 is doing on the server 14. When the same client 12 starts another application from a different browser process, for example, the client 12 gets a new ClientSession assigned to the same ServerSession 40. In the case of a portal, each ClientSession is assigned to the same ServerSession. This is guaranteed for all applications within a portal window as they use the same cookie and thus the same ServerSession.

The client manager 28 provides a ClientWindow 42 for display of an ApplicationWindow 44. The ClientWindow 42 and ApplicationWindow 44 allow a ClientApplication 46 to visualize itself without regard to who is looking, so that the application can be run in a portal or standalone without change. In a portal example, several applications within a portal have the same ClientWindow because each application displays it in the ApplicationWindow. The ClientWindow aggregates the applications if there is more than one. For example, it is helpful to imagine a menu that is shared between different applications within the same portal page. An active application has the menu. If there are three areas in the window, one is for a menu, one is for an application A and one is for an application B. When application B is active, the menu area has application B's menu, when application A is active, the menu area has application A's menu. This is handled by the ClientWindow 42. The ClientWindow 42 aggregates the ApplicationWindow 44 that contains the ClientApplication 46.

Scope is provided by the ServerSession 40, the ClientSession 38, and the ClientApplication 46. A user has one ServerSession regardless how many times or from where the user logs on. When resources are acquired, for example, a connection to a back-end machine or a data lock on the back-end machine, the resource can be registered to the appropriate one of the components that has scope. When the scope ends, for example, because one ClientSession or one ClientApplication terminates without releasing the resources, the resource is released. This provides granularity for resource management than was unavailable previously.

Figure 3:
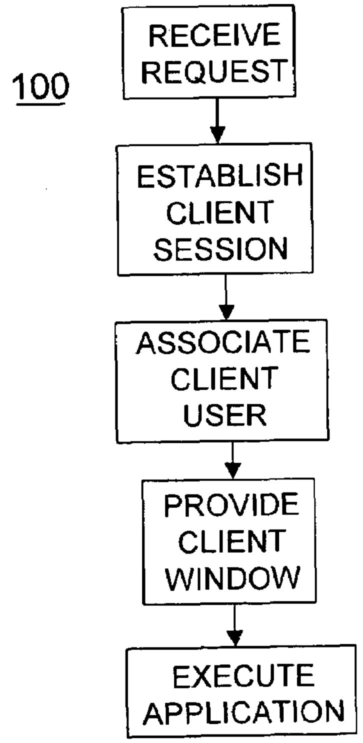
FIG. 3 is a flow diagram of a session handling process.

As shown in FIG. 3, the session handling process 100 includes receiving (102) a request from a browser client device. Process 100 establishes (104) a ClientSession and associates (106) a Client User to a ServerSession. The Server Session, for which the client has exactly one, can have one or more ClientSessions.

Process 100 provides (108) a ClientWindow for display of an ApplicationWindow. Process 100 executes (110) the requested application in the ApplicationWindow.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Other embodiments are within the scope of the following claims.

What is claimed is:

1. A method for processing requests in a network having a server and a client, the method comprising:

in the network, receiving a first request from a user as a first ClientUser request;

receiving subsequent requests from the user as subsequent ClientUser requests;

assigning the first ClientUser request and subsequent ClientUser requests from the user to a ServerSession and associating the ServerSession exclusively with the user, the ServerSession having one or more ClientSessions, the ClientSessions of a ServerSession representing requests from the user associated with the ServerSession;

acquiring a resource;

determining whether either of the ServerSession and one of the ClientSessions has scone and whether the resource should be allocated to either of the ServerSession and one of the ClientSessions;

registering the acquired resource to one of: (a) the ServerSession or (b) one of the ClientSessions based on the determinations;

releasing the resource when the scope ends; and receiving the requests by a dispatch servlet running on the server and invoking each request as a thread in a single daemon process.

2. The method of claim 1 in which the ClientSessions represent abstractions of HTTP sessions.

3. The method of claim 1 further comprising:

receiving a second request from the first user as a second ClientUser request; and assigning the second ClientUser request to the ServerSession.

4. The method of claim 1 in which the server is a web server.

5. The method of claim 4 in which the first ClientUser request is from a client using a stateless protocol.

6. The method of claim 5 in which the stateless protocol is hypertext transfer protocol (HTTP).

7. The method of claim 1 further comprising displaying a first application requested by the user in a ClientWindow, which is a user interface window that displays all applications requested by the user.

8. The method of claim 7 further comprising displaying a second application requested by the user in the ClientWindow.

9. The method of claim 8 further comprising displaying a third application requested by the user in the ClientWindow.

10. The method of claim 1 further comprising alternately displaying applications requested by the user in a single ClientWindow, which is a user interface window that displays all applications requested by the user.

11. The method of claim 1 further comprising releasing the acquired resource registered to the one or more ClientSessions upon termination of the one or more ClientSessions.

12. A method for processing requests in a network having a server and a client, the method comprising:

in the client server network, receiving a first request from a user for an application as a first ClientUser request;

receiving subsequent requests from the user as subsequent ClientUser requests;

assigning the first ClientUser request and subsequent ClientUser requests from the user to a ServerSession and associating the ServerSession exclusively with the user, the ServerSession having one or more ClientSessions, the ClientSessions of a ServerSession representing requests from the user associated with the ServerSession;

displaying a ClientWindow, which is a user interface window that displays all applications requested by the user;

displaying an ApplicationWindow, which is a user interface window that displays the application, within the ClientWindow;

executing the application in the ApplicationWindow of the ClientWindow;

acquiring a resource;

determining whether either of the ServerSession and one of the ClientSessions has scone and whether the resource should be allocated to either of the ServerSession and one of the ClientSessions registering the acquired resource to one of: (a) the ServerSession or (b) one of the ClientSessions based on the determinations; and releasing the resource when the scone ends;

wherein receiving a request comprises receiving the request by a dispatch servlet running on the server, and invoking each request as a thread in a single daemon process.

13. The method of claim 12 in which the requests are hypertext transfer protocol (HTTP) requests.

14. The method of claim 12 in which the ClientSession is a hypertext transfer protocol (HTTP) session.

15. The method of claim 12 in which the ClientWindow represents a client session.

16. The method of claim 12 in which the ApplicationWindow is a client window.

17. The method of claim 12 further comprising releasing the acquired resource registered to the one or more ClientSessions upon termination of the one or more ClientSessions.

18. A network comprising:

a browser client device; and a client manager residing in a server for receiving multiple hypertext transfer protocol (HTTP) requests from the browser client device, determining a single application window for execution of applications corresponding to the multiple HTTP requests, acquiring a resource, determining whether either of the ServerSession and one of the ClientSessions has scone and whether the resource should be allocated to either of the ServerSession and one of the ClientSessions, registering the acquired resource to a ServerSession or a ClientSession based on the determinations, and releasing the resource when the scone ends;

wherein the requests are received by a dispatch servlet running on the server, and each request is invoked as a thread in a single daemon process.

19. The network of claim 18 in which the client manager establishes client session, a single server session, a client window, and an application window in response to the multiple requests from the browser client device.

20. The network of claim 19 in which the client session is a hypertext transfer protocol (HTTP) session.

21. The network of claim 18 in which the client manager releases the acquired resource registered to the one or more ClientSessions upon termination of the one or more ClientSessions.

22. A computer program product, tangibly embodied in a computer-readable storage medium, the computer program product being operable to cause a data processing apparatus to:

receive a first request from a user for an application as a first ClientUser request;

receive subsequent requests from the user as subsequent ClientUser requests;

assign the first ClientUser request and subsequent ClientUser requests from the same user to a ServerSession and associate the ServerSession exclusively with the user, the ServerSession having one or more ClientSessions, the ClientSessions of a ServerSession representing distinct requests from the user associated with the ServerSession;

display a ClientWindow, which is a user interface window that displays all applications requested by the user;

display an ApplicationWindow, which is a user interface window that displays the application, within the ClientWindow;

execute the application in the ApplicationWindow of the ClientWindow, acquire a resource;

determining whether either of the ServerSession and one of the ClientSessions has scope and whether the resource should be allocated to either of the ServerSession and one of the ClientSessions;

register the acquired resource to one of: (a) the ServerSession or (b) one of the ClientSessions based on the determinations; and release the resource when the scope ends;

wherein the requests are received by a dispatch servlet running on a server, and each request is invoked as a thread in a single daemon process.

23. The product of claim 22 in which the requests are hypertext transfer protocol (HTTP) requests.

24. The product of claim 22 in which the ClientSessions are hypertext transfer protocol (HTTP) sessions.

25. The product of claim 22 in which the ClientWindow represents a client session.

26. The product of claim 22 in which the ApplicationWindow is a client window.

27. The product of claim 22 further being operable to cause a data processing apparatus to release the acquired resource registered to the one or more ClientSessions upon termination of the one or more ClientSessions.

28. A method comprising:

in a client/server network, providing a session that is common to all connections to a web server by a user;

acquiring a resource;

determining whether either of the ServerSession and one of the ClientSessions has scone and whether the resource should be allocated to either of the ServerSession and one of the ClientSessions;

registering the acquired resource to a ServerSession or a ClientSession based on the determinations; and releasing the resource when the scone ends;

wherein the client sends a request to the web server, the request is received by a dispatch servlet running on the server, and the request is invoked as a thread in a single daemon process.

29. The method of claim 28 in which the connections are different browser processes.

30. The method of claim 28 in which the connections are different browsers.

31. The method of claim 28 in which the connections are different client devices.

32. The method of claim 28 in which the user is a client using a stateless protocol.

33. The method of claim 32 in which the stateless protocol is hypertext markup language (HTML) protocol.

34. The method of claim 28 further comprising releasing the acquired resource registered to the one or more ClientSessions upon termination of the one or more ClientSessions.

* * * * *

UNITED STATES PATENT AND TRADEMARK OFFICE

CERTIFICATE OF CORRECTION

PATENT NO. : 7,664,860 B2
APPLICATION NO. : 10/653407
DATED : February 16, 2010
INVENTOR(S) : Beck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 981 days.

Signed and Sealed this

Seventh Day of December, 2010

David J. Kappos
*Director of the United States Patent and Trademark Office*